United States Patent
Rasmussen et al.

(10) Patent No.: US 12,271,913 B1
(45) Date of Patent: Apr. 8, 2025

(54) PREDICTIVE SOCIAL MEDIA ALERTING SYSTEM

(71) Applicant: Wells Fargo Bank, N.A., San Francisco, CA (US)

(72) Inventors: Ryan Austin Rasmussen, Chicago, IL (US); Adam R. Khan, New York City, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/006,215

(22) Filed: Aug. 28, 2020

(51) Int. Cl.
*G06Q 10/0631* (2023.01)
*G06Q 30/0201* (2023.01)
*G06Q 30/0251* (2023.01)
*H04L 51/52* (2022.01)

(52) U.S. Cl.
CPC ... *G06Q 30/0201* (2013.01); *G06Q 10/06312* (2013.01); *G06Q 10/06315* (2013.01); *G06Q 30/0252* (2013.01); *H04L 51/52* (2022.05)

(58) Field of Classification Search
CPC ............ G06Q 30/0201; G06Q 30/0255; H04L 41/0896
See application file for complete search history.

(56) References Cited

U.S. PATENT DOCUMENTS

| | | | |
|---|---|---|---|
| 5,974,457 A * | 10/1999 | Waclawsky | H04L 41/142 709/224 |
| 7,116,682 B1 * | 10/2006 | Waclawsky | H04W 8/04 370/468 |
| 8,914,371 B2 | 12/2014 | Aggarwal et al. | |
| 9,323,826 B2 | 4/2016 | Bailey et al. | |
| 9,449,218 B2 | 9/2016 | Smith et al. | |
| 10,477,416 B2 * | 11/2019 | Bhorkar | G06Q 50/01 |
| 2005/0188423 A1 * | 8/2005 | Motsinger | G06F 11/3438 714/E11.195 |
| 2008/0186926 A1 * | 8/2008 | Baio | H04L 12/185 455/466 |
| 2010/0119053 A1 | 5/2010 | Goeldi | |
| 2012/0260209 A1 * | 10/2012 | Stibel | G06Q 30/018 715/780 |

(Continued)

FOREIGN PATENT DOCUMENTS

| | | | | |
|---|---|---|---|---|
| WO | WO-2013000109 A1 * | 1/2013 | | H04W 24/02 |
| WO | WO-2016167399 A1 | 5/2015 | | |

OTHER PUBLICATIONS

Nazer, Tahora H. Xue, Guoliang. Ji, Yusheng. Lie, Huan. Intelligent Disaster Response via Social Media Analysis—A Survey. from ARXIV.org (Year: 2017).*

(Continued)

*Primary Examiner* — Johnna R Loftis
(74) *Attorney, Agent, or Firm* — SCHWEGMAN LUNDBERG & WOESSNER, P.A.

(57) ABSTRACT

Systems and methods may generally provide resource management based on a predictive alert. An example method may include receiving a set of social media messages referencing an entity, and comparing an indicator from the set of social media messages to a baseline model. Based on the comparison, a need for an increase in a resource may be identified. The method may include outputting an alert indicating the need for the increase in the resource.

20 Claims, 5 Drawing Sheets

(56) References Cited

U.S. PATENT DOCUMENTS

| | | | | |
|---|---|---|---|---|
| 2013/0229915 | A1* | 9/2013 | Parker | H04W 28/26 370/312 |
| 2014/0181982 | A1* | 6/2014 | Guo | G06F 21/60 726/25 |
| 2015/0006797 | A1 | 1/2015 | Sherman | |
| 2016/0021578 | A1* | 1/2016 | Bostick | H04W 36/0022 370/332 |
| 2016/0087927 | A1* | 3/2016 | Crudele | H04L 51/222 709/206 |
| 2016/0094458 | A1* | 3/2016 | Bostick | H04L 43/0876 370/229 |
| 2016/0282132 | A1* | 9/2016 | Bostick | G08G 1/096838 |
| 2016/0292157 | A1* | 10/2016 | Zhang | G06F 16/3344 |
| 2016/0300227 | A1* | 10/2016 | Subhedar | G06Q 20/384 |
| 2017/0156087 | A1* | 6/2017 | Bostick | H04W 48/17 |
| 2018/0232759 | A1* | 8/2018 | Bordash | G06F 16/334 |
| 2019/0012591 | A1* | 1/2019 | Limsopatham | G06N 3/0427 |
| 2019/0174289 | A1 | 6/2019 | Martin | |
| 2019/0190848 | A1* | 6/2019 | Zavesky | H04L 47/821 |
| 2019/0313230 | A1 | 10/2019 | Macgabann | |
| 2019/0370089 | A1 | 12/2019 | Patton et al. | |
| 2020/0250249 | A1* | 8/2020 | Fedoryszak | G06F 16/9536 |
| 2021/0152435 | A1* | 5/2021 | Poteat | H04L 47/823 |

OTHER PUBLICATIONS

Zarrinkalam, Fattane. Bagheri, Ebrahim. Event Identification in Social Networks. from ARXIV.org (Year: 2016).*

Nguyen, Le, et al., "Predicting collective sentiment dynamics from time-series social media", WISDOM—Proceedings of the First International Workshop on Issues of Sentiment Discovery and Opinion Mining, [Online]. Retrieved from the Internet: <URL: https://dl.acm.org/doi/abs/10.1145/2346676.2346682>, (2012), 1-8.

* cited by examiner

PREDICTIVE SOCIAL MEDIA ALERTING SYSTEM

BACKGROUND

A social network is a service that allows users to share information with one another. The social networking service may provide functionality for posting messages by the users. Some social networking services include public messages in addition to private messages among or between users. Public messages may include statements about current events or entities, such as a brand, product, company, person, etc. Private messages may be sent to another user, or to or about an entity. Social media may be used as a term to broadly discuss social networks, users, messages, and other related actions or entities.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and methods described herein may be used to provide resource management based on a predictive alert. The systems and methods discussed herein monitor social media (e.g., messages on social networks) to determine the likelihood that an upcoming event is (e.g., more probable than not, or has a minimum probability) to occur. In response to the determination, available resources of an entity may be compared to a prediction for needed resources for the entity, for example based on details of the upcoming event. The details for the potential event may include likely duration, increasing, sustained, or decreasing volume of messages, sentiment, source identity, recommendations in messages, demands in messages, or the like. The predictive alert may be used to modify resources to meet predicted needs.

A resource of an entity may, e.g., include bandwidth, server time, other physical server resources, call center employees, online chat response employees, automated response resources (e.g., a chat bot, a change to menu selections in a call-in menu, or the like), changes in website configuration (e.g., a change in a user interface component, such as placing a selectable indication on a home page), physical items to support a call center or online chat response (e.g., headsets, chairs, building space, computers, etc.), or other physical or online items that may be needed during an upcoming event. A model may be used to compare data from past events to a current set of messages from social media to determine whether a similar pattern or threshold number of messages or messages of a particular type have occurred within a time period (e.g., an hour, a day, etc.).

During crisis events (e.g. nationwide outages, leadership changes, political/regulatory events, natural disasters), there is an increased strain and need for resources of an entity. In some cases, a crisis event may result in a need for a modification to timing or content, or pausing of current advertising campaign communications, such as advertising for a company or a brand. Similarly, during positive events, such as a positive news story, increased attention and resources may be needed. In some examples, the variance of needed resources may be based on sentiment in addition to volume of messages (e.g., angry or sad sentiments in messages may correspond to a higher need than happy or satisfied sentiments in messages). When these events occur, there may be an increase in the volume of social media mentions of an entity, such as a company, brand, product, service, person, etc. In some examples, the messages may include customer discussions, media headlines, or customer reactions. The systems and methods described herein provide a custom data-driven resource to help teams make smarter decisions through social media insights.

In an example, online chat metrics, call center volume during a time period (e.g., per hour), website traffic, server processing, or organizational email may be analyzed during events and outside of events to establish a baseline and likely event metrics. The data sources may be used to develop a model using social media discussion data.

The systems and methods described herein use a baseline model, that may be created using discussion trends, such as average message volume and sentiment level (or other indicators) over a time period, related to an event that affects an entity. To establish baseline discussion trends, multivariate regression may be used. For example, a model may be developed to determine a baseline normal volume of messages (including subdivided over different other indicators, such as sentiment, source, location, etc.) for an entity (e.g., a company, a product, a brand, a service, a person, etc.). The baseline may vary depending on the time of day, time of year, day of the week, or the like.

A model may use an average indicator volume (e.g., a number of messages having a particular sentiment) over a time period, about an event related to an entity. For example, an average hourly volume may be determined for a crisis event, based on key performance indicators, such as sentiment, volume, origination of messages, etc. Past crisis events may be used to determine the time period rate (e.g., an hourly rate) of volume change of social media (e.g., messages with a particular sentiment) before, during, or after an incident. Evaluating the discrepancy between known historical crisis events and the baseline may be used to generate an hourly rate of volume change before, during, or after the event. The historical comparison provides a model for predicting whether a current event is occurring, or whether the current event is likely to increase, sustain, or decline based upon past experience.

Social media data may be aggregated (e.g., using an API). Using social media data access, for example through a social listening vendor or via sampling, datasets may be collected (e.g., past 2, 6, or 24 hours) to run against the baseline model to look for any discrepancies that indicate the presence of a crisis event.

A crisis event may be detected based on deviation from the baseline model. The deviation may be be analyzed for hourly change and compared to the hourly crisis event indicators to determine whether an event is going to occur, or when it is likely to end. The end prediction may include a prediction of a half-life of the event, which allows for a determination of when the event may no longer need additional resources (e.g., how long resources need to be maintained, when they can be eased, and when they can be returned to normal, for example).

Once an event has been determined as occurring, likely to occur, etc., an alert may be generated for adjusting (e.g., increasing or decreasing) resources of the entity. The resources needed may be determined based on the event probability, the event magnitude, the event duration, or the event type. The alert may be sent via email, message (e.g., via a messaging app or text message), automated phone call, change in a user interface configuration (e.g., flashing icon), or the like. The alert may indicate a stage of the event (e.g., not yet started, increasing, stable, decreasing, or over), a likelihood of increase, a likelihood of decrease, a probable duration of the event, or an indication of resources needed. Mitigation techniques may be identified in the alert or triggered in response to the alert, such as increasing staffing at a customer service center, pausing an advertising campaign, etc. The actions may be automated in response to the alert, such as initiating a robo-call or automated message to staff resources, increasing computer resources (e.g., bandwidth, server access, etc.), automatically pausing an advertising campaign, automatically changing a portion of an advertising campaign for a channel of the advertising campaign (e.g., stopping social media ads, but retaining tv ads, for example), automatically replacing messages in an advertising campaign to crisis-specific ads, or the like.

The systems and methods described herein may provide supplemental reporting, in some examples. For example, to supplement the trigger and help teams make decisions on resourcing and campaign timing, the qualitative analysis of the underlying drivers of the social media discussion may be provided, as it becomes available.

Figure 1:
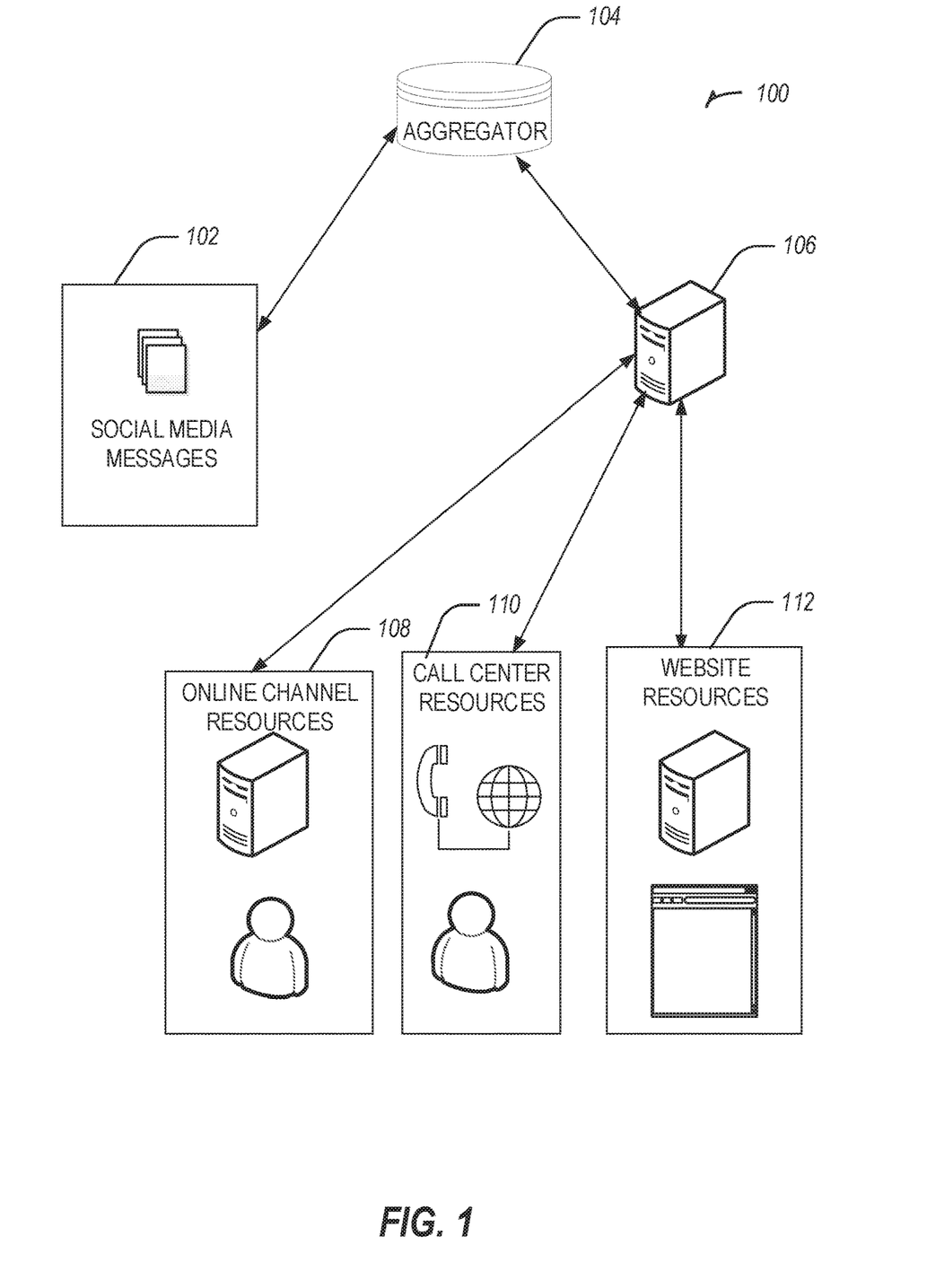
FIG. 1 illustrates a system for resource management based on a predictive alert in accordance with some embodiments.

FIG. 1 illustrates a system 100 for resource management for an entity based on a predictive alert in accordance with some embodiments. The system includes an aggregator database 104, configured to receive social media messages 102, for example via an API. The system 100 includes a device 106 (e.g., a server, a plurality of servers, etc.) configured to retrieve information related to the social media messages 102 from the aggregator database 104. The device 106 may be used to analyze the social media messages 102, for example, to compare volume of indicators for a current time period in the social media messages 102 to a baseline model.

The device 106 may be operated by or at the direction of an entity (e.g., a company). The device 106 may have insight (e.g., data or a model) into resource availability, resource need, or resource potential for operations of aspects of the entity. For example, the device 106 may receive or track current resource usage (e.g., website bandwidth, traffic, server use, call center staffing, etc.). The device 160 may receive or track available resources (e.g., have data related to people who may be called in to work at a call center, server resources that may be activated or converted, etc.).

The social media messages 102 may be received from one or more social networks (e.g., from Facebook of Menlo Park, California, Twitter of San Francisco, California, LinkedIn, of San Francisco, California, etc.), internal company or brand social networks (e.g., via a company or brand app), or the like. The aggregator database 104 may be configured to aggregate the social media messages 102, for example by storing without personal details, storing counts of indicators, or the like. The device 106 may include an analysis server configured to run a baseline model.

In an example, dependent variables may be generated as an output from the baseline model (e.g., run on the device 106) based on input related to the social media messages 102 (e.g., indicator counts retrieved from the aggregator database 104). Dependent variables generated as outputs by the baseline model may include online chat channel volume, call center volume, email volume, website hit volume, review data, location data, or the like. Independent variables used as inputs to the baseline model may include volume of social media messages, follower count of overall or high visibility messages, personal narratives, influencer status, celebrity status, sentiment, recommendations (e.g., suggested actions to be taken in social media messages), or the like.

When a deviation from the baseline is detected by the device 106 (e.g., when an indicator volume exceeds a threshold above a baseline model), the device 106 may output an alert. The alert may be sent to a central management device for coordination, or the device 106 may send the alert directly to individual resources (the latter is shown in FIG. 1, by way of example). The device 106 may issue an alert corresponding to a particular resource, such as online channel resources 108, call center resources 110, or website resources 112. The online channel resources 108 may include physical resources, such as available workstations, computers, chairs, etc., or human resources. The online channel resources 108 may include automated resources, such as a chat bot. In an example, a manager of a chat bot may be alerted that additional options need to be added to address the event. The call center resources 110 May similarly include physical or human resources. The call center resources 110 may include an automated response, such as a menu change, which may be indicated in the alert, or subsequent information related to the event. The website resources 112 may include resources, such as compute time, servers, bandwidth, etc.

The device 106 may issue subsequent alerts following an initial alert, the subsequent alerts including additional information about the event, such as a timeline, a half-life, whether the event is increasing, maintaining, or decreasing in intensity, whether the event has changed (e.g., from a particular sentiment to another sentiment), or the like. The additional information may be qualitative or quantitative. The additional information may indicate further needs or predicted needs for various resources. A half-life may include a determination or prediction of a time when the event no longer needs additional resources (e.g., how long resources need to be maintained, when they can be eased, and when they can be returned to normal, for example).

As described in further detail below, the device 106 may use results of the baseline model indicating a likelihood of an event to modify resource allocations, such as by activating additional resources (e.g., automatically contacting call center personnel to work, activating server resources or services, adding bandwidth, changing automated responses, such as by modifying a chat bot, adding a menu to an automated call service, adding an indication to a website, or the like). An alert may include an automated response (e.g., an output of an indication of what automated response is in progress or has been activated), an informational output (e.g., a recommendation for resource allocation), or a combination.

Figure 2:
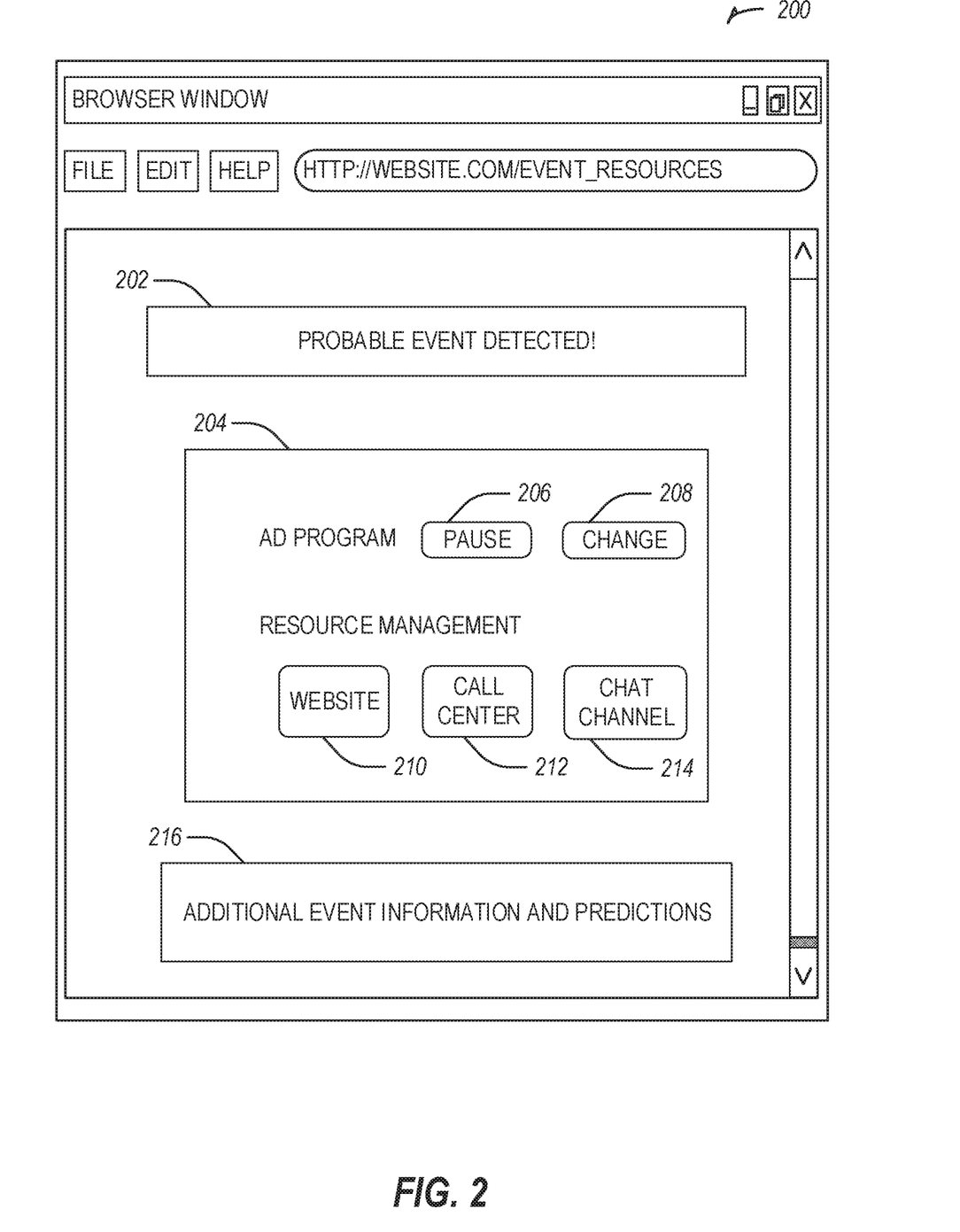
FIG. 2 illustrates a user interface for managing resources using a predictive alert in accordance with some embodiments.

FIG. 2 illustrates a user interface 200 for managing resources using a predictive alert in accordance with some embodiments. The user interface 200 is shown as website, but may include an app on a mobile device, a computer application, selections on a phone call, a text-based controller, received in an email, or the like. Although the user interface 200 is shown as a browser window (e.g., a website), the user interface 200 may, instead or in addition, include a window of an application, an email message, a direct message (e.g., on a social networking website), a text message, etc.

The user interface 200 includes an indication 202 of a likely event. The indication 202 may initially be received as an alert (e.g., in an email or text message), which when interacted with may cause the user interface to be generated on a local device. The indication 202 may provide information about the event, such as volume, comparison to historical events, likely resources needed by an entity, predicted timeline, half-life, information on whether the event is likely to increase, decrease, or maintain volume, resource needs based on the timeline, or the like.

The user interface 200 includes a response and resource management component 204, which allows a user to select various options for responding to the event. In some examples, these options may rely on an "opt out," such that the resources are activated unless a user unselects the resources. In other examples, a suggested configuration of resources may be preset, which may be automatically activated or require user activation.

The resource management component 204 includes options related to an advertising campaign, such as an option to pause 206 or change 208 the ad campaign. The pause 206 or change 208 options may provide further details, such as what channel (e.g., social media, tv, online, radio, etc.) of the advertising program to change or pause, details about pausing or changing, or a confirmation selection.

The resource management component 204 includes resource management options, such as an option to increase bandwidth or website availability 210, an option to increase call center resources 212 (e.g., add an auxiliary location, call human resources in to work (e.g., using an autodialer), increase robo-answering, an option to add a new robo-answering option, such as related to the crisis/event, or the like), or an option to increase chat channel resources 214 (e.g., human resources or chat bot resources).

An additional information component 216 may include event information or predictions. The additional information component 216 may be updated when more information becomes available related to the event. The information or predictions may include a word cloud (e.g., generated from identified social media messages), a likely timeline of the event (e.g., days, minutes, hours, weeks, etc.), whether the event is likely to increase, decrease, or sustain intensity over a time period (e.g., the next hour), or the like. Other information displayed may include a likely origin of the event (e.g., a social media message that went viral, a law, a lawsuit, a public statement, a governmental filing, a court decision, a press release, a video, a picture, or the like), personnel likely to be impacted by the event (e.g., a head of a product team for an impacted product, human resources, legal, CEO, etc.), information related to a severity of the event (e.g., likely to impact entire company, possible impact to revenue, minor event, etc.), contact information for relevant entities, or the like. Any of this information may be updated over time, such as with additional statistics, analysis, contact information, or the like.

Figure 3A:
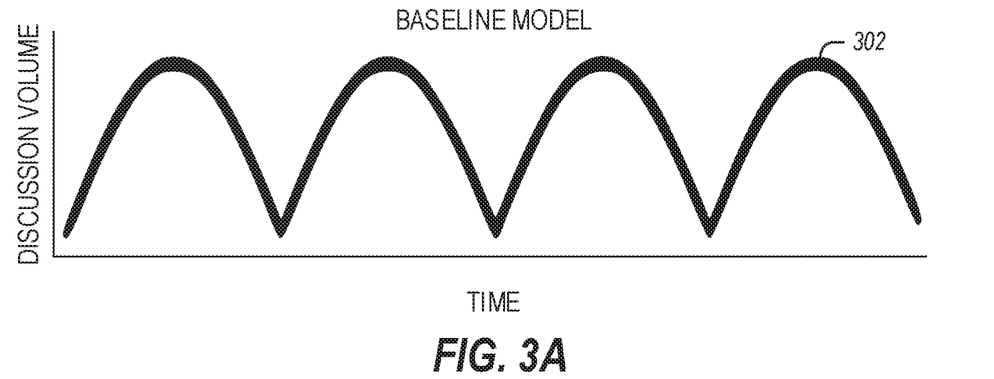
FIGS. 3A-3C illustrate model graphs for anomaly detection in accordance with some embodiments.
Figure 3B:
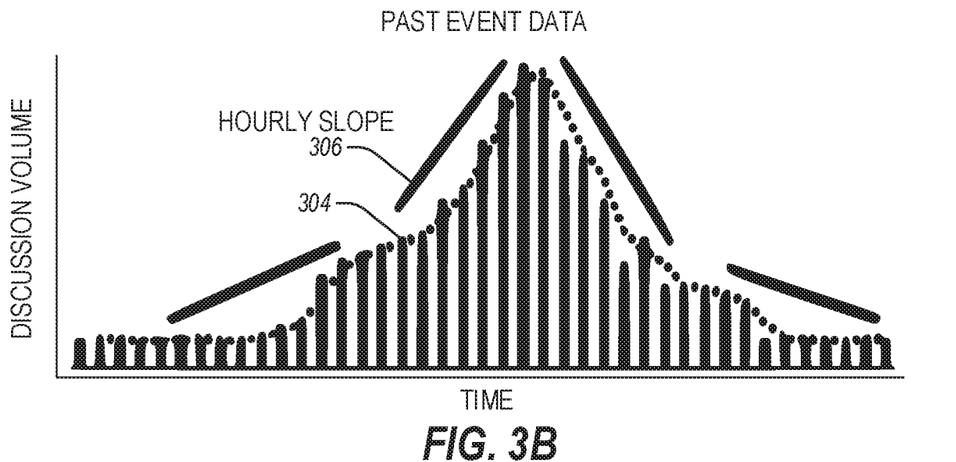
Figure 3C:
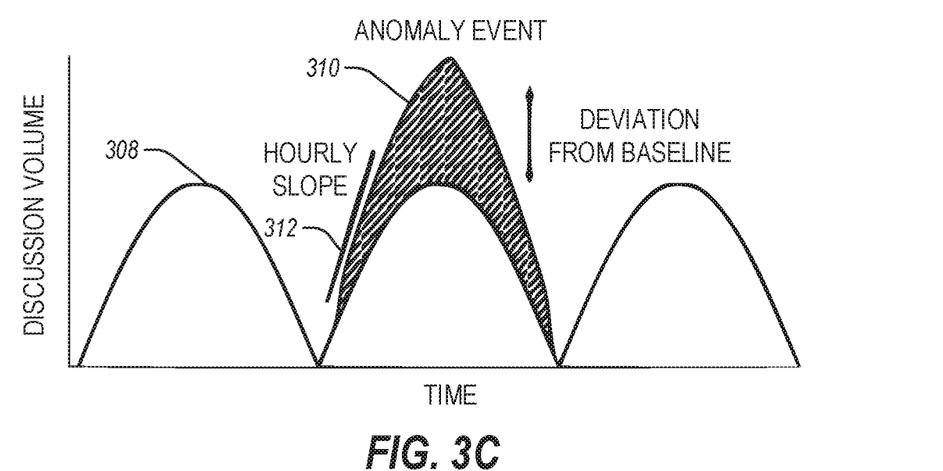

FIGS. 3A-3C illustrate model graphs for anomaly detection in accordance with some embodiments. FIG. 3A illustrates a baseline model of social media discussion, indicators, or messages related to an entity, in an example. FIG. 3B illustrates past event data, which may be compared to a baseline model (e.g., that of FIG. 3A) to determine whether an event represents an anomaly (e.g., deviates from the baseline model by some threshold). FIG. 3C illustrates an anomaly event (e.g., an event that deviates from a baseline model by a threshold, for example according to indicators).

A baseline model 302 is shown in FIG. 3A. Using multivariate regression, a quantitative model may be developed to represent normal or typical conversation volume, sentiment, or other indicators. The baseline model 302 may represent a time period, such as an hour to smooth out small spikes at any particular time. The baseline model 302 may correspond to an entity, such as a brand, a product, a service, a trademark or service mark, a name, a company, or the like.

The baseline model 302 may statistically identify a pattern of discussion indicators (e.g., volume, sentiment, etc.) over a period of time, such as a week, in hour segments. The baseline model 302 may be adjusted for day of week, time of day, month of year, holidays, or the like. In an example, the baseline model 302 may be configured to factor in events caused by an entity (e.g., by omitting, filtering, or modifying anomalous data sets), such as a press release, merger, public offering, new product, or the like.

Past event data is shown in FIG. 3B. Evaluating volume dynamics of previous events (e.g., previous crises) provides an input to a baseline model. The events may be tracked hourly or according to another time period, in an example. The previous events may provide information for the baseline model on a likelihood of when a peak will occur for a future event, such that the baseline model may output whether the event is likely to increase, sustain, or decline over an upcoming time period (e.g., an hour, or a sub-time period, such as ten minutes).

Indicators may be calculated by comparing historical events, extracting volume data points (e.g., at time 304), and measuring a slope 306 (e.g., an hourly slope) of the past event data. Based on changes in the slope 306 (e.g., increases, levels out, or decreases), over a time period (e.g., hourly during the event), the baseline model may be generated. The baseline model May include averages of slopes or peaks, in an example. In another example, the baseline model may include an AI model, such as a machine learning model that uses the slopes as input, and resources needed to manage the event as labeled output data.

An anomalous event (e.g., a crisis) is shown in FIG. 3C. Social media messages from a particular time period may be used as a dataset to compare to a baseline model 308. A deviation 310 from the baseline model 308 may be identified (e.g., according to a particular time period), for example using a slope 312 (e.g., for the particular time period, such as an hour). A deviation 310 from the baseline 308 may be determined, and an alert output, for example when the deviation 310 exceeds a threshold over the baseline 308, according to an example. In another example, an alert may be output when the deviation 310 exceeds the baseline 308 and the slope 312 transgresses a threshold or is within a particular range.

Although the y-axis in FIGS. 3A-3C are shown as discussion volume, they may be substituted with sentiment (e.g., of a particular type, such as anger, sadness, etc.), or another indicator (e.g., volume among influencers, percentage positive or negative messages, or the like). In an example, a combination of indicators may be used (e.g., discussion volume and sentiment). In some examples, the graphs may be three-dimensional or n-dimensional. For example, multiple sentiments may be compared over time in a baseline model, where the baseline model may be represented as a 3-D or N-D curve. Deviations in one dimension may be sufficient to trigger an alarm in some examples, or deviations may need to be detected in multiple dimensions.

After detection of the deviation 310, an alert may be output. The alert may include an email. The alert may include identification of an entity's resources (e.g., bandwidth for a website, call center employees, social network response employees, automated assets, such as a new robo-answering selection or a chat bot, or the like) needed to handle the event. The alert may include a likelihood of increase, decrease, or sustaining of the event. The alert may include a duration of the event. The alert may include (or later be supplemented with) other data, such as sentiment information, a word cloud, analysis or identification of an underlying driver of the deviation 310, or the like. The alert may include (or later be supplemented with) product or service issues, brand issues, or the like. The alert may include (or later be supplemented with) implicit or explicit recommendation triggers, such as reflected through Boolean keyword flagging, or custom engagement metrics, for example following validation of data volume. The alert may include (or later be supplemented with) an automatic action, such as suspending an advertising campaign, calling in additional resources, making a social media channel private, or the like.

Figure 4:
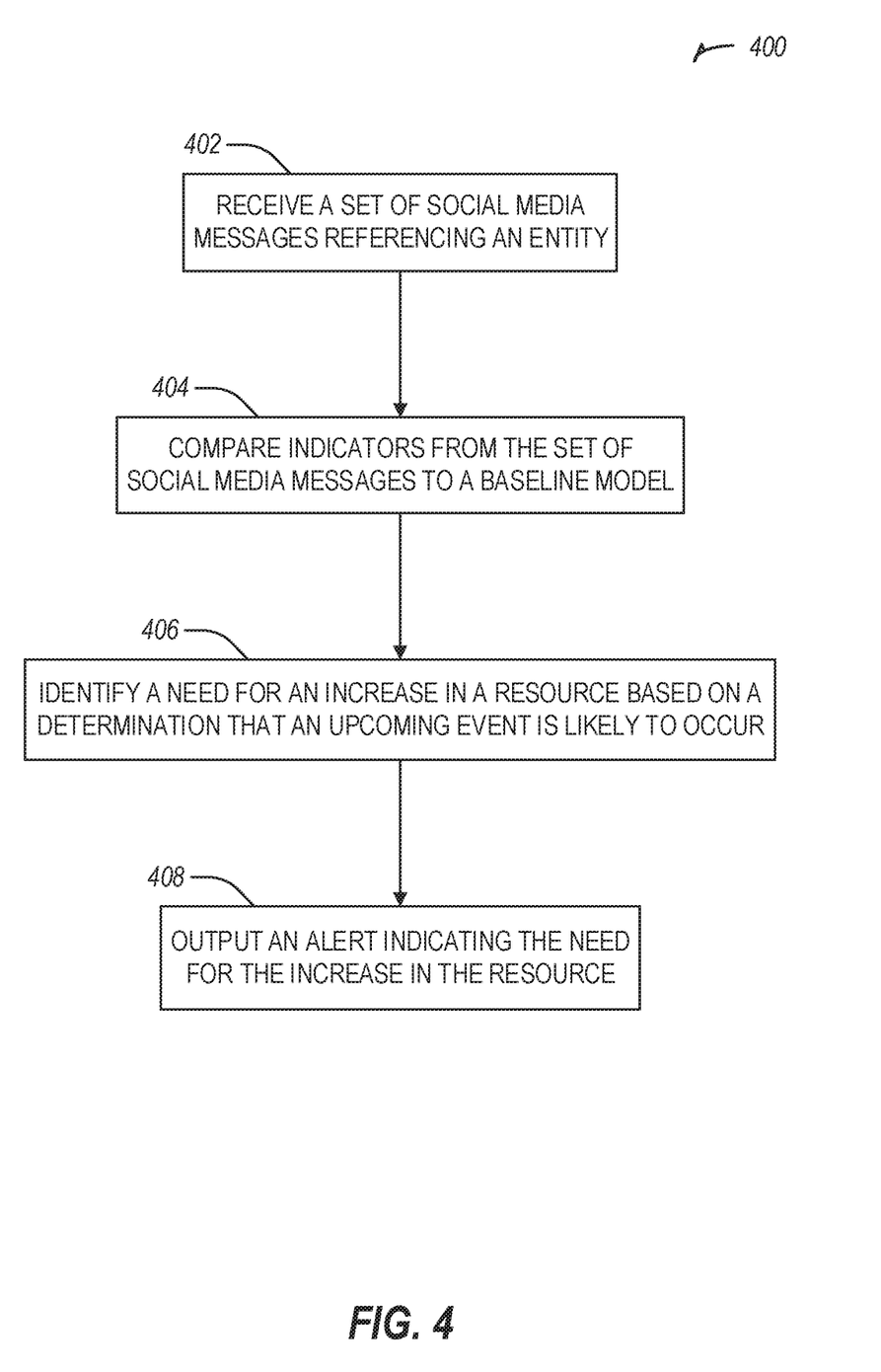
FIG. 4 illustrates a flowchart showing a technique for resource management based on a predictive alert in accordance with some embodiments.

FIG. 4 illustrates a flowchart showing a technique 400 for resource management based on a predictive alert in accordance with some embodiments. In an example, operations of the technique 400 may be performed by processing circuitry, for example by executing instructions stored in memory. The processing circuitry may include a processor, a system on a chip, or other circuitry (e.g., wiring). For example, technique 400 may be performed by processing circuitry of device 106 (or one or more hardware or software components thereof), such as those illustrated and described with reference to FIGS. 1 and 5.

The technique 400 includes an operation 402 to receive a set of social media messages referencing an entity. The set of social media messages may be filtered, before or after receipt, to include messages referencing an entity during a time period. The entity may include a company, a brand, a product, a service, a person, or the like.

The technique 400 includes an operation 404 to compare indicators from the set of social media messages to a baseline model. The baseline model may correspond to the entity. The comparison may include determining whether an upcoming event related to the entity is likely to occur. The upcoming event may correspond to a resource of the entity. In an example, the resource of the entity includes at least one of bandwidth available for accessing a website, staffing for a call center, staffing for an online chat channel, or the like. In an example, operation 404 may include determining that a metric combining the indicators exceeds a threshold over the baseline model. The threshold may be based on an individual indicator, such as compared to a corresponding single indicator in the baseline model, in another example. The threshold may be based on past events.

The indicators may include at least one of a follower count for a social media account (e.g., an increase or decrease in followers of the entity on a social network), sentiment of a message (e.g., positive or negative, with further breakdown in some examples, such as anger, disappointment, sadness, confusion, etc.), a recommendation in a message (e.g., a recommendation to 'cancel' the entity, not use the entity or an aspect of the entity, avoid the entity, buy this instead of entity or product of entity, don't buy the entity or product of the entity, etc.), popularity of an originator of a message (e.g., an influencer, a celebrity, a number of followers, etc.), a type of originator of a message (e.g., from a media outlet, a consumer, a celebrity, a customer, a sponsor, etc.), or the like.

The technique 400 includes an operation 406 to identify a need for an increase in a resource based on a determination that an upcoming event is likely to occur. Operation 406 may be based on a determination that the upcoming event is likely to occur after the time period (e.g., in a subsequent time period, such as an immediately next time period).

The technique 400 includes an operation 408 to output an alert indicating the need for the increase in the resource of the entity. The alert or a subsequent alert may indicate a likely half-life or end time for the upcoming event. For example, the alert or subsequent alert may include information on decreasing resources, such as de-staffing or cutting bandwidth or server time, or may include resuming previous baseline functions, such as unpausing or updating an ad campaign, or otherwise resuming messaging content output. Operation 408 may include outputting an initial indication, including a likely crisis or event is on the horizon, then following up with a second indication, including further details (e.g., likely to last x amount of time, likely to impact these business lines, these channels, likely to include personal vs political anger, etc.). In an example, outputting the alert includes sending an email to an email address associated with managing the entity. The alert may include a word cloud generated using the set of social media messages, in an example.

The technique 400 may further include determining a state of the upcoming event, such as whether the upcoming event is likely to increase, sustain, or decline in intensity over a next time period following the time period. The state may include sentiment information, or indicate an urgency of response, in an example. The urgency of response may include a written indication, such as "urgent" or "not-urgent" or "somewhat urgent" or may include a non-written indication, such as marking an email important (e.g., via a flag), sending an email to an urgent response team or email address, or by repeatedly sending an email until a response is received or until a change is identified (e.g., to an online dashboard).

The technique 400 may include automatically pausing or changing an aspect of an advertising campaign for the entity, such as based on the determination that the upcoming event is likely to occur. In another example, the alert may indicate that an advertising campaign should or may be altered or paused. The advertising campaign may be altered in any of several ways, such as reducing, limiting, or eliminating social media messages, reducing, limiting, or eliminating television or print advertisements, changing words, tone, or images in advertisements, or the like. The changes may be based on the indicators, such as sentiment data or originator data. For example, when the upcoming event is triggered by a particular influencer or celebrity, a message may be initiated to engage with that particular influencer or celebrity. In another example, when the sentiment data indicates fear, a reassuring message may be output or indicated. Changing or pausing an ad campaign may include manage timing of the ad campaign, such as by pausing, stopping, or changing times, changing volume, change channel (e.g., from social media to web ad or to television), changing message, etc.

In an example, the baseline model may be an artificial intelligence (AI) model, such as a machine learning model. The AI model may be trained using labeled data, such as including data from previous events, with needed resources being labeled. The AI model may be trained using inputs corresponding to messages in social media, such as date, time, volume of discussions, number of unique authors, sentiment of messages, or other indicators, in some examples. Once trained, the AI model may run online or offline, receiving a set of social media messages, and outputting a prediction, estimation, or likelihood of an upcoming event exceeding a baseline or threshold.

Figure 5:
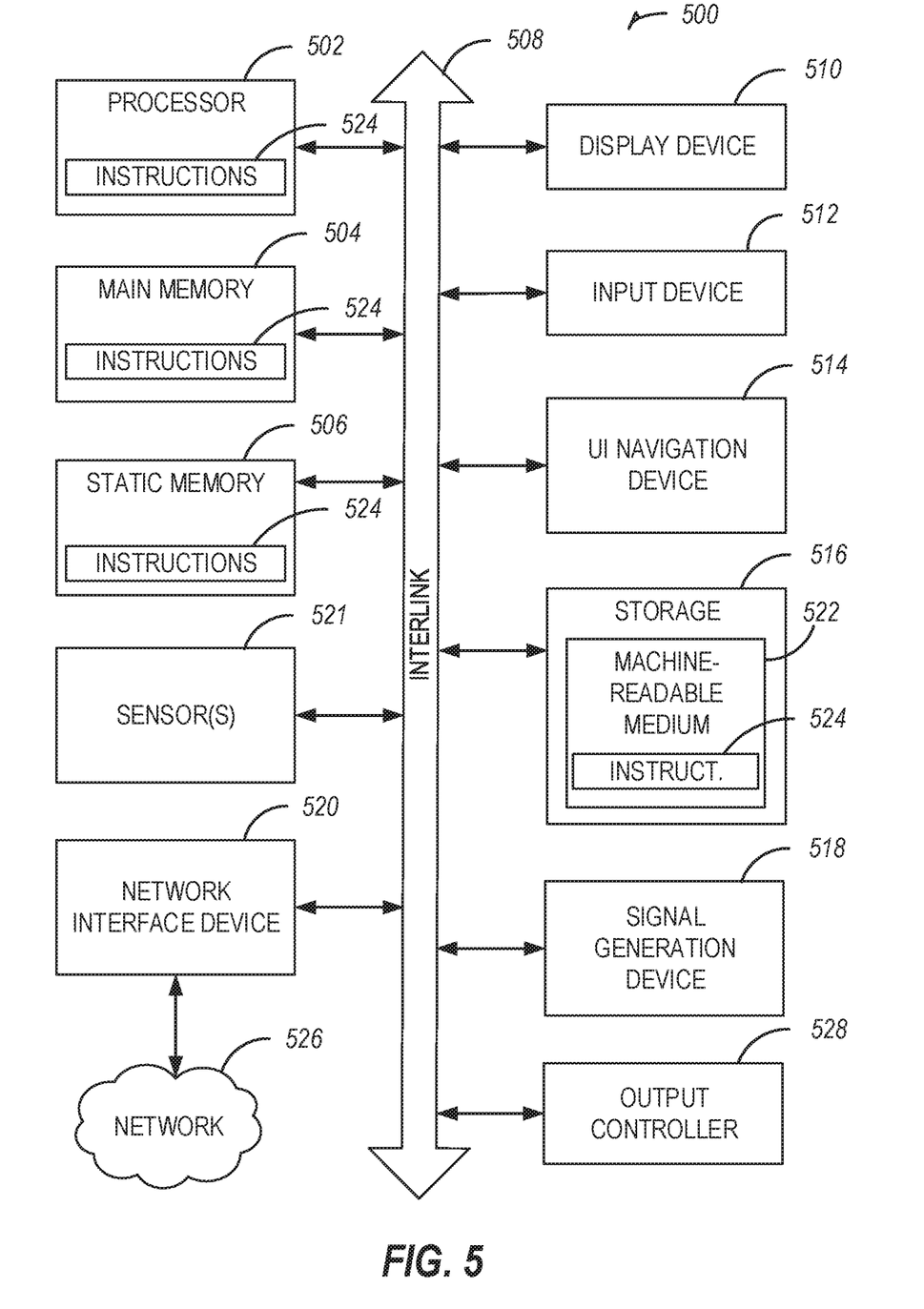
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Example 1 is a method comprising: receiving a set of social media messages referencing an entity during a time period; comparing indicators from the set of social media messages to a baseline model to determine the likelihood of an upcoming event related to the entity to occur, the upcoming event having an impact on a resource of the entity; identifying a need for an increase in the resource of the entity based on the determination of the likelihood that the upcoming event is to occur after the time period; and outputting an alert indicating the need for the increase in the resource of the entity.

In Example 2, the subject matter of Example 1 includes, wherein comparing indicators to the baseline model includes determining that a metric combining the indicators exceeds a threshold over the baseline model.

In Example 3, the subject matter of Examples 1-2 includes, determining a state of the upcoming event including a likelihood that the upcoming event increases, sustains, or declines in intensity over a next time period following the time period.

In Example 4, the subject matter of Examples 1-3 includes, wherein the resource of the entity includes at least one of bandwidth available for accessing a website, staffing for a call center, or staffing for an online chat channel.

In Example 5, the subject matter of Examples 1-4 includes, automatically pausing or changing an aspect of an advertising campaign for the entity based on the determination of the likelihood that the upcoming event is to occur.

In Example 6, the subject matter of Examples 1-5 includes, wherein the alert indicates a probable half-life or end time for the upcoming event.

In Example 7, the subject matter of Examples 1-6 includes, wherein outputting the alert includes sending an email to an email address associated with managing the entity.

In Example 8, the subject matter of Examples 1-7 includes, wherein the entity includes a company, a brand, a product, or a service.

In Example 9, the subject matter of Examples 1-8 includes, wherein the alert includes a word cloud generated using the set of social media messages.

In Example 10, the subject matter of Examples 1-9 includes, wherein the indicators include at least one of a follower count for a social media account, sentiment of a message, a recommendation in a message, popularity of an originator of a message, or a type of originator of a message.

Example 11 is a system comprising: a processor; and memory, comprising instructions, which when executed by the processor, cause the processor to: receive a set of social media messages referencing an entity during a time period; compare indicators from the set of social media messages to a baseline model to determine the likelihood of an upcoming event related to the entity to occur, the upcoming event having an impact on a resource of the entity; identify a need for an increase in the resource of the entity based on the determination of the likelihood that the upcoming event is to occur after the time period; and output an alert indicating the need for the increase in the resource of the entity.

In Example 12, the subject matter of Example 11 includes, wherein to compare indicators to the baseline model, the instructions further cause the processor to determine that a metric combining the indicators exceeds a threshold over the baseline model.

In Example 13, the subject matter of Examples 11-12 includes, wherein the instructions further cause the processor to determine a state of the upcoming event including a likelihood that the upcoming event increases, sustains, or declines in intensity over a next time period following the time period.

In Example 14, the subject matter of Examples 11-13 includes, wherein the resource of the entity includes at least one of bandwidth available for accessing a website, staffing for a call center, or staffing for an online chat channel.

In Example 15, the subject matter of Examples 11-14 includes, wherein the instructions further cause the processor to automatically pause or change an aspect of an advertising campaign for the entity based on the determination of the likelihood that the upcoming event is to occur.

In Example 16, the subject matter of Examples 11-15 includes, wherein the alert indicates a probable half-life or end time for the upcoming event.

In Example 17, the subject matter of Examples 11-16 includes, wherein to output the alert, the instructions further cause the processor to send an email to an email address associated with managing the entity.

In Example 18, the subject matter of Examples 11-17 includes, wherein the entity includes a company, a brand, a product, or a service.

In Example 19, the subject matter of Examples 11-18 includes, wherein the alert includes a word cloud generated using the set of social media messages.

In Example 20, the subject matter of Examples 11-19 includes, wherein the indicators include at least one of a follower count for a social media account, sentiment of a message, a recommendation in a message, popularity of an originator of a message, or a type of originator of a message.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
receiving a set of social media messages referencing an entity during a time period;
comparing, using a processor, indicators from the set of social media messages to a baseline model to determine a likelihood of an upcoming event related to the entity to occur, the upcoming event having an impact on a resource of the entity, the resource including bandwidth available for accessing a website, wherein the baseline model is trained to output a prediction based on labeled data from previous events;
determining whether the bandwidth available for accessing the website is insufficient to provide access to the website based on the likelihood and the impact;
identifying, using the processor, a need for an increase in the resource of the entity based on the determination of the likelihood that the upcoming event is to occur after the time period, the determination indicating that the likelihood exceeds a threshold, and based on determining that the bandwidth available for accessing the website is insufficient;
predicting an end time for the upcoming event by comparing indicators from the set of social media messages to the baseline model, the indicators from the set of social media messages including a number of unique authors;
outputting an alert indicating the need for the increase in the resource of the entity and the predicted end time for the upcoming event;
automatically increasing, using the processor, the bandwidth available for accessing the website in response to outputting the alert; and
automatically decreasing, using the processor, the bandwidth available for accessing the website at the predicted end time.

2. The method of claim 1, wherein comparing indicators to the baseline model includes determining that a metric combining the indicators exceeds a threshold over the baseline model.

3. The method of claim 1, further comprising determining a state of the upcoming event including a likelihood that the upcoming event increases, sustains, or declines in intensity over a next time period following the time period.

4. The method of claim 1, wherein the resource of the entity includes at least one of staffing for a call center, or staffing for an online chat channel.

5. The method of claim 1, further comprising, automatically pausing or changing an aspect of an advertising campaign for the entity based on the determination of the likelihood that the upcoming event is to occur.

6. The method of claim 1, wherein the alert indicates a probable half-life for the upcoming event.

7. The method of claim 1, wherein outputting the alert includes sending an email to an email address associated with managing the entity.

8. The method of claim 1, wherein the entity includes a company, a brand, a product, or a service.

9. The method of claim 1, wherein the alert includes a word cloud generated using the set of social media messages.

10. The method of claim 1, wherein the indicators include at least one of a follower count for a social media account, sentiment of a message, a recommendation in a message, popularity of an originator of a message, or a type of originator of a message.

11. A system comprising:
a processor; and
memory, comprising instructions, which when executed by the processor, cause the processor to:
receive a set of social media messages referencing an entity during a time period;
compare indicators from the set of social media messages to a baseline model to determine a likelihood of an upcoming event related to the entity to occur, the upcoming event having an impact on a resource of the entity, the resource including bandwidth available for accessing a website, wherein the baseline model is trained to output a prediction based on labeled data from previous events;
determine whether the bandwidth available for accessing the website is insufficient to provide access to the website based on the likelihood and the impact;
identify a need for an increase in the resource of the entity based on the determination of the likelihood that the upcoming event is to occur after the time period, the determination indicating that the likelihood exceeds a threshold, and based on determining that the bandwidth available for accessing the website is insufficient;
predict an end time for the upcoming event by comparing indicators from the set of social media messages to the baseline model, the indicators from the set of social media messages including a number of unique authors;
output an alert indicating the need for the increase in the resource of the entity and the predicted end time for the upcoming event;
automatically increase the bandwidth available for accessing the website in response to outputting the alert; and
automatically decrease the bandwidth available for accessing the website at the predicted end time.

12. The system of claim 11, wherein to compare indicators to the baseline model, the instructions further cause the processor to determine that a metric combining the indicators exceeds a threshold over the baseline model.

13. The system of claim 11, wherein the instructions further cause the processor to determine a state of the upcoming event including a likelihood that the upcoming event increases, sustains, or declines in intensity over a next time period following the time period.

14. The system of claim 11, wherein the resource of the entity includes at least one of staffing for a call center, or staffing for an online chat channel.

15. The system of claim 11, wherein the instructions further cause the processor to automatically pause or change an aspect of an advertising campaign for the entity based on the determination of the likelihood that the upcoming event is to occur.

16. The system of claim 11, wherein the alert indicates a probable half-life for the upcoming event.

17. The system of claim 11, wherein to output the alert, the instructions further cause the processor to send an email to an email address associated with managing the entity.

18. The system of claim 11, wherein the entity includes a company, a brand, a product, or a service.

19. The system of claim 11, wherein the alert includes a word cloud generated using the set of social media messages.

20. The system of claim 11, wherein the indicators include at least one of a follower count for a social media account, sentiment of a message, a recommendation in a message, popularity of an originator of a message, or a type of originator of a message.

* * * * *